United States Patent

Glavitsch et al.

[11] Patent Number: 6,069,779
[45] Date of Patent: May 30, 2000

[54] METHOD FOR OPERATING A LINE

[75] Inventors: Hans Glavitsch, Nussbaumen; Mohamed Rahmani, Zollikerberg, both of Switzerland

[73] Assignee: Asea Brown Boveri AG, Baden, Switzerland

[21] Appl. No.: 09/110,842

[22] Filed: Jul. 7, 1998

[30] Foreign Application Priority Data

Jul. 11, 1997 [DE] Germany ............ 197 29 658

[51] Int. Cl.⁷ ............................ H02H 3/26
[52] U.S. Cl. ............................ 361/79; 361/18
[58] Field of Search ............ 361/93.6, 77, 62–69, 361/87, 86, 85, 110, 79, 18; 307/126, 127, 131; 363/34–37

[56] References Cited

U.S. PATENT DOCUMENTS 5,134,356  7/1992  El-Sharkawi et al. ........... 323/211
5,710,492  1/1998  Konishi et al. ................. 318/156

FOREIGN PATENT DOCUMENTS

3339428C2  5/1985  Germany ............ H02H 3/30

OTHER PUBLICATIONS

"Analysis of a 3–Level–VSI Neutral–Point Control for Fundamental Frequency Modulated SVC–Applications", Scheuer, et al., AC and DC Power Transmission, Conference Publication No. 423, IEE, Apr. 1996.

*Primary Examiner*—Ronald W. Leja
*Attorney, Agent, or Firm*—Burns, Doane, Swecker & Mathis, L.L.P.

[57] ABSTRACT

A method is specified for operating a multiphase line which is included in a transmission network and can be disconnected if faults occur, for the transmission of electrical power. The method comprises the following method steps: a) detecting upstream and downstream of the line, data which characterize the operating status of the transmission network, b) processing the detected data in order to identify a fault, c) switching off at least one faulty phase of the line on the basis of the identified fault, and d) activating a balancing compensator which feeds compensation currents into the transmission network such that the currents flowing in the transmission networks form a balanced system. This method has the major advantage that, now, even lines subject to faults can be used for the transmission of electrical power.

13 Claims, 3 Drawing Sheets

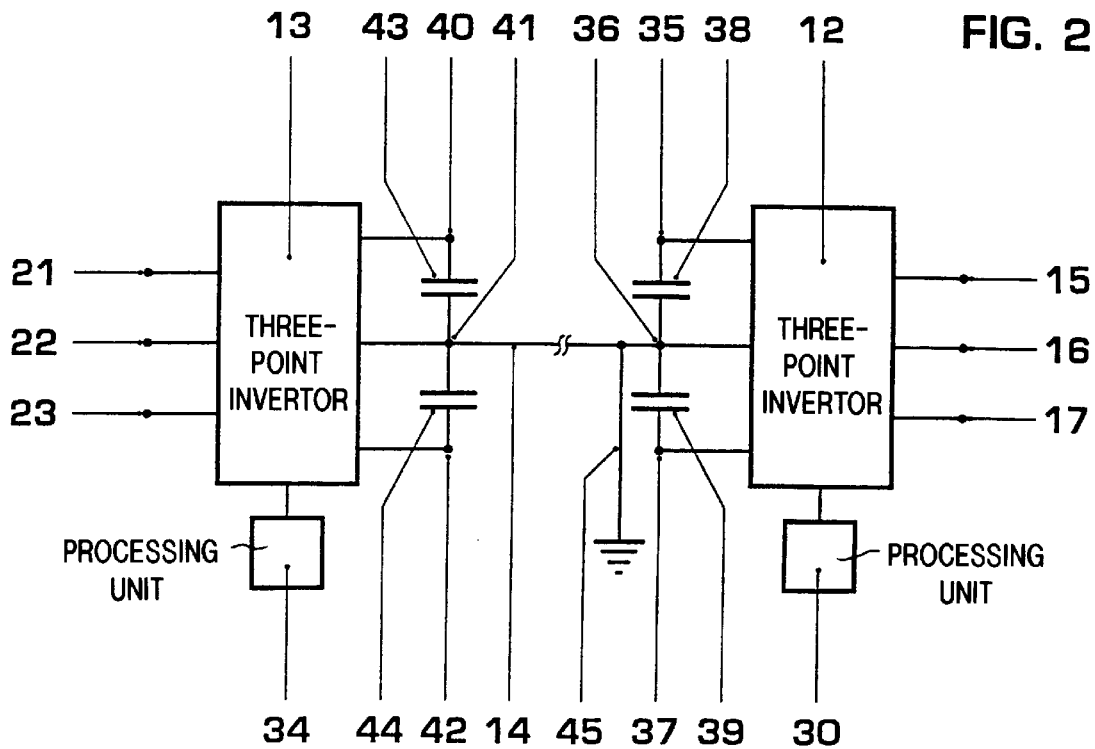

Detection, upstream and downstream of the line, of data which characterize the operating status of the transmission network Processing of the detected network data in order to identify a fault Switching off at least one faulty phase of the line on the basis of the identified fault Activation of a balancing compensator which feeds compensation currents into the transmission network such that the currents flowing in the transmission network form a balanced system

METHOD FOR OPERATING A LINE

BACKGROUND OF THE INVENTION

1. Field of the Invention

The invention relates to a method for operating a multiphase line, which is included in a transmission network, for the transmission of electrical power, and to an apparatus for carrying out this method.

2. Discussion of Background

When faults occur in a line in an electrical transmission network, attempts are normally made to overcome the fault in the line by quickly switching on again. However, if this process of quickly switching on again is unsuccessful, then all three phases of the relevant line must be switched off until the fault has been rectified. The relevant line cannot be used throughout this switched-off period. If this switched-off line is used as a link between two important nodes in the transmission network, then this interruption can cause problems in network operation; it may, for example, have a negative influence on the stability of the network, or it may lead to thermal overloading of lines that are still in the network.

The use of three-point invertors in transmission networks is known, for example, from the article "Analysis of a 3-level-VSI neutral-point-control for fundamental frequency modulated SVC-applications", which was introduced at the IEE Meeting on April 29–May 3 1996 and was published as Conference Publication No. 423, pages 303 to 310.

SUMMARY OF THE INVENTION

Accordingly, one object of the invention is to provide a novel method for the operation of a multiphase line which is included in a line network, which method considerably improves the availability of this line in the event of faults and, furthermore, the intention is to provide an apparatus for carrying out this method.

The method as claimed in the invention allows the availability of partially defective lines to be considerably improved with comparatively little effort. The invention allows better utilization of existing lines, which leads to a considerable improvement in the transmission reliability of existing lines, particularly in regions where it is not feasible to build new high-voltage transmission lines.

Statistical analyses show that the great majority of all the faults in lines of transmission networks are single-phase faults. The invention allows the negative influences of this predominant majority of all faults to be reduced advantageously since, as a rule, despite the single-phase fault, somewhat more than two thirds of the power transmission capacity of the healthy line in retained. The effects of two-phase faults in a three-phase transmission network can likewise be partially compensated for by means of the invention. As a rule, in this case, a power flow can be maintained of somewhat more than one third of the power which flows through this line when it is not faulty. In accordance with an exemplary embodiment of the invention, a method is provided for operating a multiphase line which is included in a transmission network for the transmission of electrical power. The line has a plurality of phases that can each be selectively disconnected. The method the step of detecting, upstream and downstream of the line, data which characterize the operating status of the transmission network. The method further includes the steps of processing the detected data in order to identify a fault, disconnecting at least one faulty phase of the line on the basis of the identified fault, and activating a balancing compensator which feeds compensation currents into the transmission network such that the currents flowing in the transmission networks form a balanced system.

Exemplary embodiments of the invention and the advantages which can be achieved with it are described in more detail in the following text with reference to the drawing, which illustrates only one possible embodiment.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 shows a schematically illustrated second embodiment of the apparatus according to the invention, FIG. 3 shows a block diagram of a method according to the invention.

Only those elements which are required for immediate understanding of the invention are illustrated.

DESCRIPTION OF THE PREFERRED EMBODIMENTS

Figure 1:
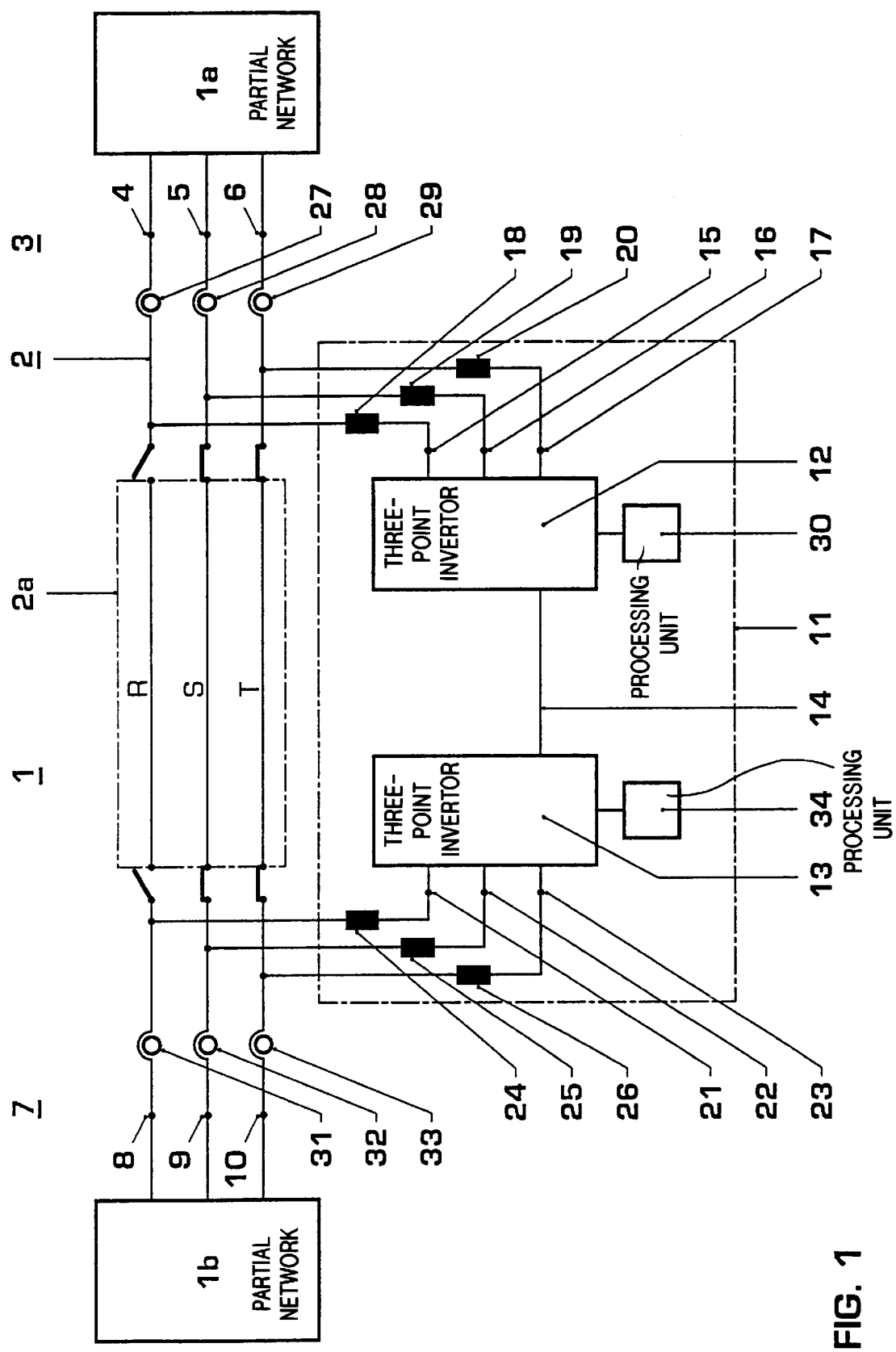
FIG. 1 shows a detail of a transmission network with a schematically illustrated first embodiment of an apparatus according to the invention.

Referring now to the drawings, wherein like reference numerals designate identical or corresponding parts throughout the several views, FIG. 1 shows a detail of a three-phase transmission network 1, which is illustrated schematically by two partial networks 1a and 1b. In this transmission network 1, a three-phase line 2 connects a first network node 3, which is connected to the partial network 1a and has the terminals 4, 5, 6, to a second network node 7, which is connected to the partial network 1b and has the terminals 8, 9, 10. The phase R of the line 2 extends between the terminals 4 and 8, the phase S of the line 2 extends between the terminals 5 and 9, and the phase T of the line 2 extends between the terminals 6 and 10. The line 2 has a region 2a which can be switched off and at whose two ends power breakers, which are not designated, are provided in a known arrangement in each phase, and these power breakers can switch off the respective phase and completely isolate it from the transmission network 1 if, for example, a fault were to occur in this phase. In FIG. 1, phase R is illustrated switched off, while the two other phases S and T continue to operate.

A balancing compensator 11 is connected in parallel with the line 2. The balancing compensator 11 has two three-point invertors 12 and 13 which are connected to GTO (Gate Turn-Off) thyristors or to IGBTs (Insulated Gate Bipolar Transistors) and are connected to one another by means of a separate equalizing conductor 14. The first three-point invertor 12 has three input terminals 15, 16, 17. The input terminal 15 is electrically conductively connected to the terminal 4 of the network node 3, a control inductor 18 being provided in this link. The input terminal 16 is electrically conductively connected to the terminal 5 of the network node 3, a control inductor 19 being provided in this link. The input terminal 17 is electrically conductively connected to the terminal 6 of the network node 3, a control inductor 20 being provided in this link.

The second three-point invertor 13 has three input terminals 21, 22, 23. The input terminal 21 is electrically conductively connected to the terminal 8 of the network node 7, a control inductor 24 being provided in this link. The input terminal 22 is electrically conductively connected to the terminal 9 of the network node 7, a control inductor 25 being provided in this link. The input terminal 23 is electrically conductively connected to the terminal 10 of the network node 7, a control inductor 26 being provided in this link.

However, it is also feasible, in certain applications, for the self-inductance of the said links to be so high that it is unnecessary to fit separate control inductors. If the three-point invertors 12 and 13 are connected to the network nodes 3 and 7 by means of coupling transformers, then, as a rule, the stray inductance of these coupling transformers may be sufficient for the control function.

Each of the phases R, S and T is fitted, upstream of the region 2a of the line 2 which can be switched off, with schematically indicated sensors 27, 28, 29 which are used to monitor the status and the load of the line 2, and, inter alia, the currents flowing through the phases R, S and T of the line 2 are also detected, in particular. These sensors 27, 28, 29 are operatively connected on the one hand to the protection of the line 2 and, on the other hand, are operatively connected to the processing unit 30, which likewise processes the data detected by the sensors 27, 28, 29. When the protection identifies a fault and, if appropriate, generates control commands to switch off the individual phases of the line 2, then the processing unit 30 identifies this situation as well, and ensures appropriate actuation of the three-point invertor 12, which is then activated such that it starts to act as part of the balancing compensator 11. If, prior to this activation, this three-point invertor 12 has been acting as a VAr compensator or as a voltage regulator, then it continues to carry out this task if this should still be necessary with respect to the changed operating status of the transmission network 1.

Downstream of that region 2a of the line 2 which can be switched off, each of the phases R, S and T is fitted with schematically illustrated sensors 31, 32, 33 which are used to monitor the status and the load on the line 2 and, inter alia, the currents flowing through the phases R, S and T of the line 2 are also detected, in particular. These sensors 31, 32, 33 are on the one hand operatively connected to the protection of the line 2 and, on the other hand, are operatively connected to the processing unit 34, which likewise processes the data detected by the sensors 31, 32, 33. When the protection identifies a fault and, possibly, generates control commands to switch off individual phases of the line 2, then the processing unit 34 likewise identifies this situation and ensures appropriate actuation of the three-point invertor 13, which is then activated such that it likewise starts to act as part of the balancing compensator 11. If, prior to this activation, this three-point invertor 13 has been acting as a VAr compensator or as a voltage regulator, then it continues to carry out this task if this should still be necessary with respect to the changed operating status of the transmission network 1. The two processing units 30 and 34 can be connected to one another by means of a control line, resulting in the two three-point invertors 12 and 13 operating in synchronism. The two processing units 30 and 34 interact with the protection and with the superordinate instrumentation and control system for the transmission network 1, so that the operational reliability of the transmission network 1 is considerably improved.

FIG. 2 shows one option for how the DC voltage outputs of the three-point invertors 12 and 13 can be connected. The three-point invertor 12 has, on the output side, a positive terminal 35, a center terminal 36 and a negative terminal 37. A capacitor 38 is arranged between the positive terminal 35 and the center terminal 36. A capacitor 39 is arranged between the negative terminal 37 and the center terminal 36. The two capacitors 38 and 39 have the same capacitance. When the balancing compensator 11 is activated, these two capacitors 38 and 39 are used as energy stores.

The three-point invertor 13 has, on the output side, a positive terminal 40, a center terminal 41 and a negative terminal 42. A capacitor 43 is arranged between the positive terminal 40 and the center terminal 41. A capacitor 44 is arranged between the negative terminal 42 and the center terminal 41. The two capacitors 43 and 44 have the same capacitance. When the balancing compensator 11 is activated, these two capacitors 43 and 44 are used as energy stores. As a rule, the capacitors 38, 39, 43 and 44 have the same capacitance. The two center terminals 36 and 37 are connected to one another by the equalizing conductor 14.

The balancing conductor 14 is grounded in the region close to the center terminal 36, as a ground link 45 shows. As a rule, this grounding may be direct but, in certain network conditions, it is also possible to connect a non-reactive resistor in the groundlink 45. The currents of the zero phase-sequence system flow through the equalizing conductor 14 and the line 2 when the balancing compensator 11 is activated. With respect to the partial networks 1a and 1b, the zero phase-sequence system is in this case completely suppressed, if the three-phase current system is regarded as a positive, negative and zero phase-sequence system.

FIG. 3 shows a block diagram of a method according to the invention. This method for operating a multiphase line 2, which is included in a transmission network 1 and can be disconnected phase-by-phase when faults occur, for the transmission of electrical power comprises the following method steps:

a) detection of the status of the transmission network 1, upstream and downstream of the line 2, by means of the sensors 27, 28, 29, 31, 32 and 33, b) processing of the detected data in order to identify a fault, c) switching off at least one faulty phase R of the line 2 on the basis of the identified fault, and d) activating the balancing compensator 11, which feeds compensation currents into the transmission network 1 such that the currents flowing in the transmission network 1 form a balanced system.

As a rule, the balancing compensator 11 is activated at the same time that the faulty phase R of the line 2 is switched off. After this, the electrical power is transmitted via the non-faulty phases of the line 2, these being the phases S and T in the case of this exemplary embodiment, which continue to be available for power transmission once the fault has been switched off. As a rule, before it is activated, the balancing compensator 11 acts as a VAr compensator or as a voltage regulator, and it also continues to carry out this function when it is additionally activated as a balancing compensator 11, provided this should continue to be necessary with respect to the changed operating status of the transmission network 1.

Figure 4:
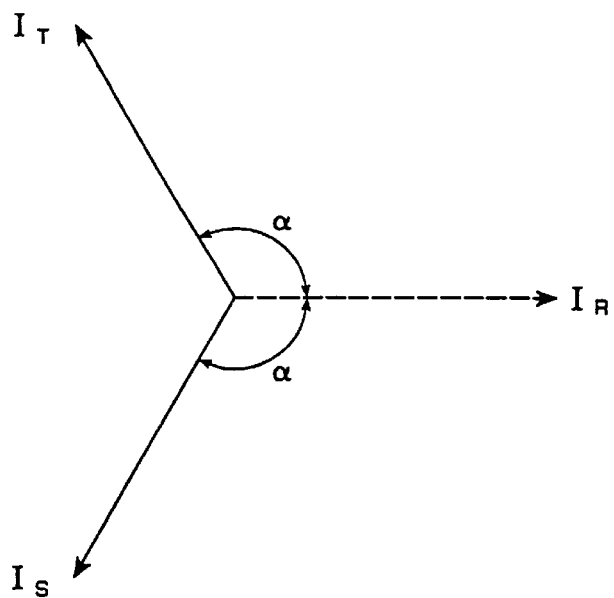
FIGS. 4 to 7 show vector diagrams which indicate the method of operation of a balancing compensator with respect to balancing a transmission network.

FIGS. 4 to 7 will now be considered in order to explain the method of operation of the balancing compensator 11. FIG. 4 shows a vector diagram of the three currents whose magnitudes are the same and which flow through the initially fault-free line 2 in normal operation, which is assumed to be the ideal. The vector $I_R$ which is shown by a dashed line represents the current flowing in the phase R, the vector $I_S$ represents the current flowing in the phase S, and the vector $I_T$ represents the current flowing in the phase T. The three vectors $I_R$, $I_S$ and $I_T$ are in this case respectively rotated through an angle α with respect to one another, which angle α in the basic ideal case is 120°. As soon as the phase R is switched off owing to a fault, the current $I_R$ can no longer flow through this phase of the line 2, and the vector $I_R$ which is shown by a dashed line must then be regarded as being missing. At this point, the transmission network 1 now has an unbalanced load. If this operating status were continued, then, in a conventionally designed and operated transmission network 1, disturbances would occur on rotating machines and comparatively large and unacceptable voltage drops would occur. In this case, the protection of the transmission network 1 would have to switch off all three phases of the faulty line 2 and the disadvantages linked to this would have to be accepted in order to avoid greater consequential damage. The faulty line would therefore be lost completely for power transmission.

However, if the balancing compensator 11 is activated together with the single-phase switching off of the faulty phase R, then the negative effects of the fault on the operation of the transmission network 1 can be reduced in an advantageous manner. When the balancing compensator 11 is activated at the same time that the phase R is switched off, the load of the transmission network 1 is immediately changed from an unbalanced load to a balanced load, on both sides of the line 2, one phase of which has been interrupted. If it is assumed that the partial network 1a feeds the electrical power via the line 2 into the partial network 1b, then a single-phase load is applied to the partial network 1a with the three-point invertor 12 of the balancing compensator 11, and this load corresponds exactly to the load (which is now missing in the network) from the phase R of the line 2, in terms of amplitude and phase angle. This measure results in a balanced load on this side of the line 2 in the transmission network 1. On the opposite side of the line 2, the three-point invertor 13 has to feed the phase current (which is missing there) of the phase R into the partial network 1b at the correct phase angle and at the correct amplitude, so that, despite the fault, the network conditions on this side are likewise balanced. Viewed from the transmission network 1, the faulty line 2 together with the balancing compensator 11 which is connected in parallel with said line 2 and has now been activated constitutes a balanced load, ignoring the discrepancies which are always present in a transmission network and are caused, for example, by different line impedances in the phases.

The current which corresponds to the vector $I_R$ illustrated in FIG. 4 is extracted from the transmission network 1 by the three-point invertor 12 once the balancing compensator 11 has been activated, so that the partial network 1a continues to be loaded with the same three-phase current as before the disturbance, corresponding to the vector diagram shown in FIG. 4. The three-point invertor 12 converts this single-phase current in to a three-phase compensator current.

Figure 5:
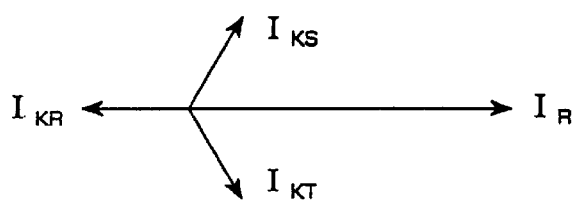

As can be seen from FIG. 5, this three-phase compensator current is composed of the following components: the vector $I_{KR}$, which is directed exactly opposite to the current which is extracted from the phase R of the partial network 1a and is represented by the vector $I_R$, and whose magnitude is one third of the magnitude of the vector $I_R$, the vector $I_{KS}$ which is directed exactly opposite to the current which flows in the phase S of the transmission network 1 and is represented by the vector $I_S$ and whose magnitude is one third of the magnitude of the vector $I_S$, and the vector $I_{KT}$ which is directed exactly opposite to the current which flows in phase T of the transmission network 1 and is represented by the vector $I_T$ and whose magnitude is one third of the magnitude of the vector $I_T$.

Figure 6:
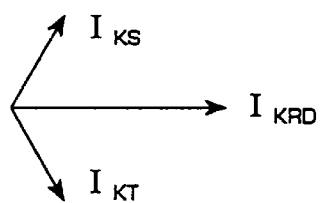
Figure 7:
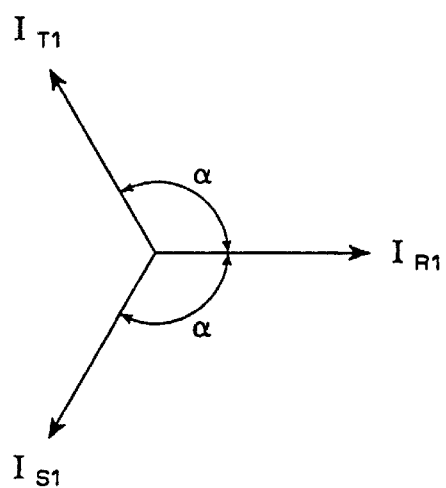

FIG. 6 shows the definitive vector diagram of the compensator current which is derived from FIG. 5 and results after superimposition of the vectors $I_R$ and $I_{KR}$ to form the resultant vector $I_{KRD}$. This compensator current is superimposed on the currents which flow in the partial network 1a and are represented by the vectors $I_S$ and $I_T$ in FIG. 4. The result of this superimposition is illustrated in FIG. 7. The resultant vectors $I_{R1}$, $I_{S1}$ and $I_{T1}$ represent the resultant balanced currents which flow in the phases R, S and T of the partial network 1a, and their magnitudes are each two thirds of the magnitude of the associated vectors $I_R$, $I_S$ and $I_T$ for the same phases. In this case, the magnitude and phase angle of the vector $I_{R1}$ correspond to those of the vector $I_{KRD}$ for the compensator current. However, like the partial network 1b, the partial network 1a can be regarded as a rigid network with a constant network voltage, which acts on the network node 3 and immediately compensates for any current and voltage fluctuations in this region.

The second three-point invertor 13 acts on the partial network 1b of the transmission network 1 in a similar manner to the three-point invertor 12 just described, drawing a corresponding three-phase current from the partial network 1b, converting it, and, for this purpose, feeding a single-phase current, whose magnitude and phase correspond to the vector $I_R$ into phase R of the partial network 1b. The currents associated with the zero phase-sequence system flow through the equalizing conductor 14 which connects the two three-point invertors 12 and 13. The circuit for the zero phase-sequence system is closed via the two healthy phases S and T of the line 2.

The magnitude of the two vectors $I_S$ and $I_T$, which represent the currents flowing in the healthy phases, is however (provided realistic network conditions are assumed) always somewhat greater than the magnitude of the corresponding vectors $I_S$ and $I_T$ in normal network operation. Therefore, as a rule, the two healthy phases S and T of the line 2 transmit significantly more than two thirds of the total power which the non-faulty line 2 can transmit. In a conventional 380 kV transmission network, the power transmitted via a line in which one phase is switched off is in the region of 80% to 90% of the power transmitted during normal operation, depending on the length of the line. This advantageously high power level which can be transmitted with a line 2 where one phase is defective results in a considerably improved operating behavior, and better availability of the transmission network 1.

If two lines 2 are operating in parallel, then the balancing compensator 11 acts on both lines 2 in the event of a fault. In such a case, if there is a single-phase fault in one of the two lines 2, the transmitted power is in the region of 93% to 97% of the power transmitted during normal operation, depending on the length of the lines 2.

The balancing compensator 11 allows existing lines 2 to be better utilized and, particularly in regions where it is not feasible to build new high-voltage transmission lines, this leads to a considerable improvement in the transmission reliability of existing lines 2.

Statistical analyses have shown that the great majority of all faults in transmission networks 1 with operating voltages above 110 kV are single-phase faults. If balancing compensators 11 are increasingly used in such networks, then the negative effects of this predominant majority of all faults can be reduced in an advantageous manner.

Furthermore, it is particularly advantageous that the effects of two-phase faults in a three-phase transmission network 1 can also be partially compensated for by means of the balancing compensator 11. As a rule, in this case, the power flow that can be maintained is somewhat more than one third of the power which flows during normal operation.

If a spur line leaves from a transmission network 1 to a large consumer, then it is advantageous for this spur line to be equipped with a balancing compensator 11 since this ensures an uninterruptible power supply even in the event of a fault. Furthermore, this makes it possible to reinforce the particularly important lines 2 which connect the transmission networks of two countries.

A large number of advantageous application options for the balancing compensator 11 are feasible, since its application is not just limited to high-voltage networks, and the balancing compensator 11 can also be used in an advantageous manner in medium and low-voltage networks.

The equalizing conductor 14 can, as a rule, also be fitted to already existing overhead line pylons when an existing overhead line is being retrofitted with a balancing compensator 11. Since it is impossible for any excessively high voltage to build up on the equalizing conductor 14, one side of which is grounded, the space requirement for this additional conductor is comparatively small, so that sufficient space is available on all conventional present-day overhead line pylons. Even if, owing to high current loads, the equalizing conductor 14 had to be designed as a double line, the available space is even adequate for this. The equalizing conductor 14 can thus be fitted retrospectively with comparatively little effort.

If existing transmission networks are equipped with balancing compensators 11 in each substation and these balancing compensators 11 are activated when a fault occurs then, as already described, the zero phase-sequence currents are absorbed by the respectively activated balancing compensator 11. The residual currents which still remain in this case are transferred to the adjacent balancing compensators 11 so that, overall, balancing compensators 11 with a smaller installed rating can be fitted, as a result of which the economy of the overall concept is improved in an advantageous manner.

Obviously, numerous modifications and variations of the present invention are possible in light of the above teachings. It is therefore to be understood that within the scope of the appended claims, the invention may be practiced otherwise than as specifically described herein.

LIST OF DESIGNATIONS

1 Transmission network
1a, 1b Partial network
2a Region which can be switched off
2 Line
3 Network node
4, 5, 6 Terminals
7 Network node
8, 9, 10 Terminals
11 Balancing compensator
12, 13 Three-point invertors
14 Equalizing conductor
15, 16, 17 Input terminals
18, 19, 20 Control inductors
21, 22, 23 Input terminals
24, 25, 26 Control inductors
27, 28, 29 Sensors
30 Processing unit
31, 32, 33 Sensors
34 Processing unit
35 Positive terminal
36 Center terminal
37 Negative terminal
38, 39 Capacitor
40 Positive terminal
41 Sensor terminal
42 Negative terminal
43, 44 Capacitor
45 Ground connection
R, S, T Phase designation
$I_R$, $I_T$, $I_T$ Vector of the network current during normal operation
$I_{KR}$, $I_{KS}$, $I_{KT}$ Vector of the compensator current
$I_{KR}$, $I_{S1}$, $I_{T1}$ Vector of the network current when the balancing compensator is activated
$I_{KRD}$ Vector of the compensator current

What is claimed is:

1. A method for operating a multiphase line which is included in a transmission network for the transmission of electrical power, the line having a plurality of phases that can each be selectively disconnected, which method comprises the following method steps:

a) detecting upstream and downstream of the line data which characterize the operating status of the transmission network, b) processing the detected data in order to identify a fault, c) disconnecting at least one faulty phase of the line on the basis of the identified fault, and d) activating a balancing compensator which feeds compensation currents into the transmission network such that the currents flowing in the transmission network form a balanced system.

2. The method as claimed in claim 1,
   wherein the activation of the balancing compensator to feed compensation currents into the transmission network takes place at the same time as the disconnect command for the at least one faulty phase of the line.

3. The method as claimed in claim 2,
   wherein the balancing compensator continues to act as a VAr compensator or as a voltage regulator before and after being activated to feed compensation currents into the transmission network.

4. The method as claimed in claim 1,
   wherein power transmission takes place through the at least one non-faulty phase of the line.

5. An apparatus for carrying out the method as claimed in claim 1, which apparatus comprises a line which can be disconnected when faults occur, for the transmission of electrical power, sensors for the detection upstream and downstream of the line of the data which characterize the operating status of the transmission network, and a processing device for the detected data,
   wherein a balancing compensator which is connected, upstream and downstream of the line, to the phases of the transmission network is connected in parallel with the line.

6. The apparatus as claimed in claim 5,
   wherein the balancing compensator has at least two multipoint invertors which are connected on the input side to the phases of the transmission network and of which a first is arranged at a start of the line and a second is arranged at an end of the line, and
   wherein the at least two multipoint invertors are connected to one another by means of at least one equalizing conductor.

7. The apparatus as claimed in claim 6, wherein, in the case of a three-phase network, the multipoint invertors are designed as three-point invertors.

8. The apparatus as claimed in claim 7, wherein each of the three-point invertors is connected on the output side to capacitors, a first capacitor respectively being arranged between a positive terminal and a center terminal, and a second capacitor respectively being arranged between the center terminal and a negative terminal, and wherein the two capacitors each have the same capacitance value.

9. The apparatus as claimed in claim 8, wherein the equalizing conductor is connected to the two center terminals of the two three-point invertors, and wherein the equalizing conductor is connected to ground in the region close to one of the center terminals.

10. The apparatus as claimed in claim 7, wherein the three-point invertors are connected to GTO (Gate Turn-Off) thyristors or to IGBTs (Insulated Gate Bipolar Transistors).

11. The apparatus as claimed in claim 5, wherein connecting lines are provided between the balancing compensator and the transmission network and control inductors are provided in the connecting lines.

12. The apparatus as claimed in claim 6, wherein the equalizing conductor is designed as an overhead line routed parallel to the line.

13. A method for operating a multiphase line which is included in a transmission network for the transmission of electrical power, the line having a plurality of phases that can each be selectively disconnected, which method comprises the following method steps:

a) detecting upstream and downstream of the line data which characterize the operating status of the transmission network, b) processing the detected data in order to identify a fault, c) disconnecting at least one faulty phase of the line on the basis of the identified fault, and d) activating a balancing compensator which feeds compensation currents into the transmission network such that the currents flowing in the transmission network form a balanced system while the at least one faulty phase of the line is disconnected.

\* \* \* \* \*